United States Patent [19]

Gropper et al.

[11] 4,322,029

[45] Mar. 30, 1982

[54] AIR DRIVEN CENTRIFUGE HAVING A TACHOMETER

[75] Inventors: Lee Gropper, Los Altos; Robert C. Franklin, Los Gatos, both of Calif.

[73] Assignee: Beckman Instruments, Inc., Fullerton, Calif.

[21] Appl. No.: 154,732

[22] Filed: May 29, 1980

[51] Int. Cl.[3] .......................... B01D 21/26; B04B 9/00

[52] U.S. Cl. .................................. 233/1 R; 233/23 A

[58] Field of Search .............. 233/1 R, 1 A, 1 B, 1 C, 233/23 R, 23 A, 21, 24, 26, 27; 308/DIG. 1, 9

[56] References Cited

U.S. PATENT DOCUMENTS

| | | | |
|---|---|---|---|
| 3,456,875 | 7/1969 | Hein | 233/24 |
| 3,958,753 | 5/1976 | Durland | 233/1 C |
| 4,036,428 | 7/1977 | Durland | 233/23 R |
| 4,046,316 | 9/1977 | Hein | 233/1 C |
| 4,046,317 | 9/1977 | Hein | 233/1C |
| 4,078,719 | 3/1978 | Durland | 233/23 R |
| 4,244,513 | 1/1981 | Fayer | 233/23 R |

*Primary Examiner*—Edward J. McCarthy
*Attorney, Agent, or Firm*—R. J. Steinmeyer; F. L. Mehlhoff; Al A. Canzoneri

[57] ABSTRACT

In accordance with the present invention, there is provided an air driven centrifuge including a rotor housing having an access door in which there is mounted the illuminating and sensing elements of a photo-optical tachometer with the elements so constructed and arranged that they are positioned over the rotor when the door is in a closed position. There is also provided a rotor cover having at least a portion of its surface conditioned to alternately absorb and reflect incident light, and digital display means to display the rotor speed in R.P.M.

7 Claims, 5 Drawing Figures

AIR DRIVEN CENTRIFUGE HAVING A TACHOMETER

BACKGROUND OF THE INVENTION

This invention relates to centrifuges, and more particularly to apparatus for measuring the rotational velocity of an air driven centrifuge rotor.

Air driven centrifuges are used for centrifuging fluid mixtures of the type that require extremely high speed to separate into their respective fractions. Also, since it is generally true that at higher centrifugation speeds less time is required to achieve a desired fractionation, it has been recognized that air driven centrifuges are useful for reducing the processing time and cost of many types of laboratory work.

Air driven centrifuges such as disclosed in U.S. Pat. No. 3,958,753 issued to Durland et al., and assigned to Beckman Instruments, Inc., the assignee of the present invention, are capable of reaching speeds as high as 200,000 R.P.M. Speeds of this magnitude are attainable because the rotor of such a machine is rotated and supported on a cushion of air by pressurized air streams.

A problem which has been experienced by users of air driven centrifuges is that it has heretofore been difficult to ascertain true rotor velocity. Unlike shaft-driven centrifuges which can incorporate conventional tachometer means, the floating rotor of an air driven centrifuge is not adaptable to mechanical or electromechanical speed-sensing methods. Accordingly, users usually estimate rotor velocity by measuring the air pressure driving the rotor. Frequently, charts or graphs are employed to translate air pressure to R.P.M. (revolutions per minute). In many instances the accuracy of this method is found to be insufficient for the intended purpose. In such cases users have employed electronic photo-optical tachometers or stroboscopic speed measuring equipment to make more accurate determinations of rotor velocity. It is, of course, required that a window be provided on the machine to enable such optical means to measure rotor velocity. In many instances, the user has found these speed measuring methods manifestly inconvenient.

In the case of stroboscopic tachometers for example, it is necessary for the operator to adjust the flashing rate of the instrument until synchronism is achieved with the speed of the rotating object, at which point the motion of the object appears to freeze. The speed of the rotating object is then determined by reading the dial setting of the stroboscopic tachometer's flashing rate control knob. Accordingly, the speed readout by this method is not only not instantaneous, but the operator usually requires an assistant if it is desired to adjust the speed of the centrifuge, since the operator's two hands are occupied with holding and adjusting the stroboscopic tachometer.

In the case where handheld digital photo-optical tachometers are employed for measuring the rotor speed of an air driven centrifuge, it is generally necessary that the rotor carry a highly reflective target so that the photo sensor can detect and count each revolution of the rotor. It has been found extremely difficult to employ the usual devices such as reflective tape for this purpose, as the extremely high centrifugal forces tend to throw off such appliques. The necessity for providing a highly reflective target is in the main due to the relatively long distance between the external photo-optics and the rotor. As a matter of conjecture, there is also the possibility that a portable device may be inherently less sensitive (than a built-in tachometer) because the plane of the illuminator is likely to be parallel to the plane of the receptor, rather than convergent.

SUMMARY OF THE INVENTION

In accordance with the present invention, there is provided an air driven centrifuge including a rotor housing having an access door in which there is mounted the illuminating and sensing elements of a photo-optical tachometer with the elements so constructed and arranged that they are positioned over the rotor when the door is in a closed position. There is also provided a rotor cover having at least a portion of its surface conditioned to alternately absorb and reflect incident light, and digital display means to display the rotor speed in R.P.M.

DETAILED DESCRIPTION OF THE INVENTION

Figure 1:
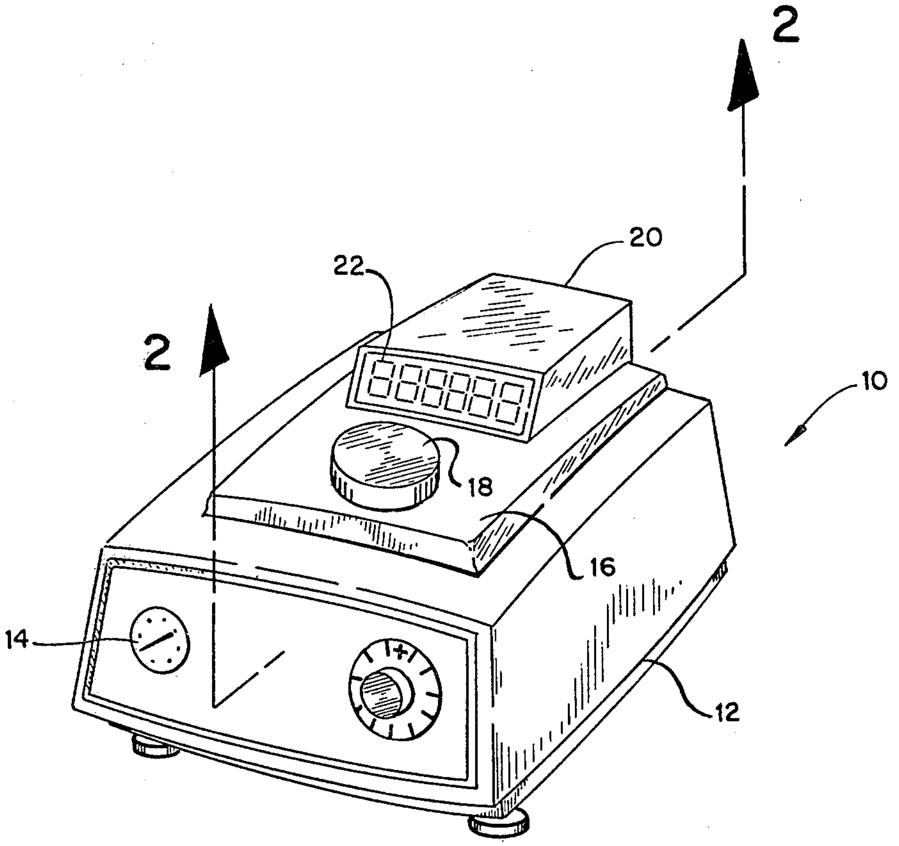
FIG. 1 is a perspective view of the air driven centrifuge of the invention.

In FIG. 1 there is illustrated a centrifuge device 10 having an outer housing or casing 12, an air pressure gauge 14, a hinged door 16 and air pressure control and door-locking knob 18. Also mounted on door 16 is enclosure 20 which houses a digital display 22 on its sloping front side.

Figure 2:
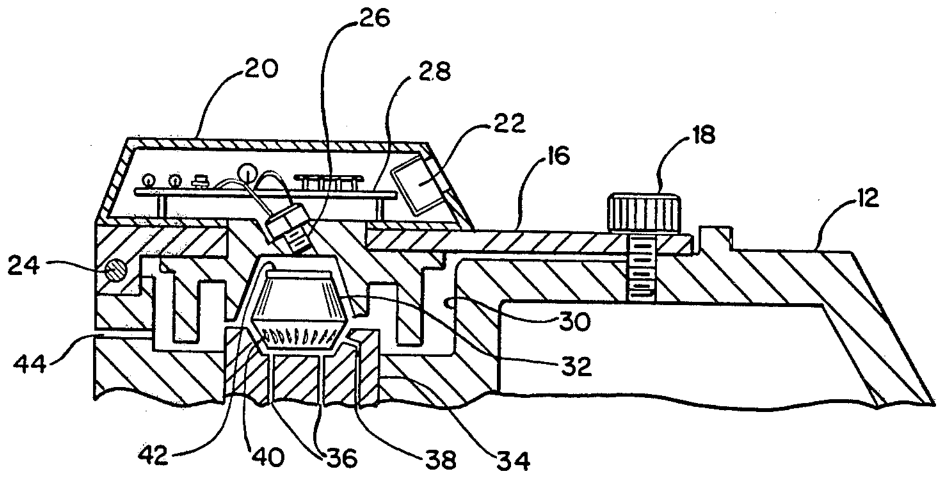
FIG. 2 is a partial cross-sectional view of FIG. 1 taken across the lines 2—2.

Referring now to FIG. 2, there is shown a partial cross-sectional view of the centrifuge, including outer casing 12, and hinged access door 16 which pivots on hinge 24. Also shown on door 16 is air pressure control and door-locking knob 18 and the enclosure 20. Within enclosure 20 is a digital display device 22, a photo-optical sensor 26 containing an LED (light emitting diode) and a photo-transistor (shown schematically in FIG. 5 as *26a* and *26b*, respectively). Also situated within enclosure 20 is tachometer and display driving circuitry 28. Situated in rotor chamber 30 is rotor seat 34 containing levitation air passages 36 and turbine driving air passages 38 (only one of which are shown in FIG. 2) which impinge an air stream upon a plurality of turbine flutes 40 on a lower surface of rotor 32, causing it to rotate while floating on a cushion of air supplied by the aforementioned passages, after which the air is exhausted to the outside through port 44 in the housing.

Figure 3:
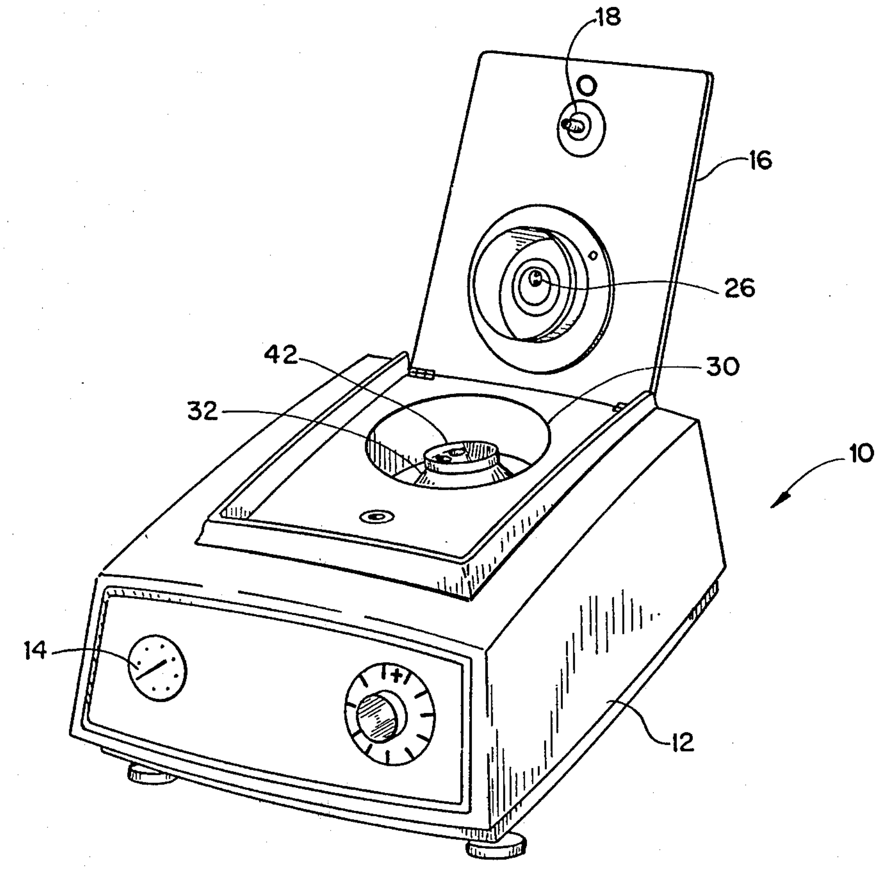
FIG. 3 is a perspective view of the centrifuge of FIG. 1 shown with the access door in the open position.

Referring now to FIG. 3, there is shown centrifuge 10 with its access door 16 in the open position, showing photo-optical sensor 26, the rotor chamber 30, rotor 32 and rotor cover 42.

Figure 4:
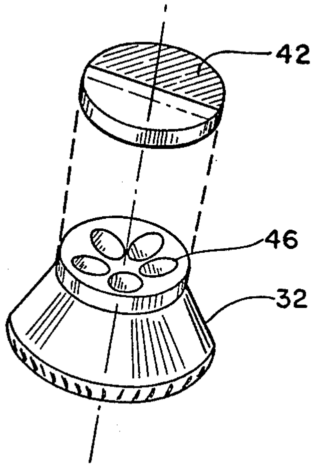
FIG. 4 is an exploded perspective view of a typical rotor and its rotor cover.

Referring now to FIG. 4, there is illustrated an exploded perspective view of a typical rotor 32, having tube cavities 46 and rotor cover 42. It will be noted that a non-reflecting surface such as a black matte finish has been applied to half of the surface of cover 42, so that the incident light reflected by the cover will be interrupted once for each rotation of the rotor. This is only one type of rotor to which the invention is applicable. Other rotor configurations are possible so long as their upper surface can be made alternately reflecting and non-reflecting.

Figure 5:
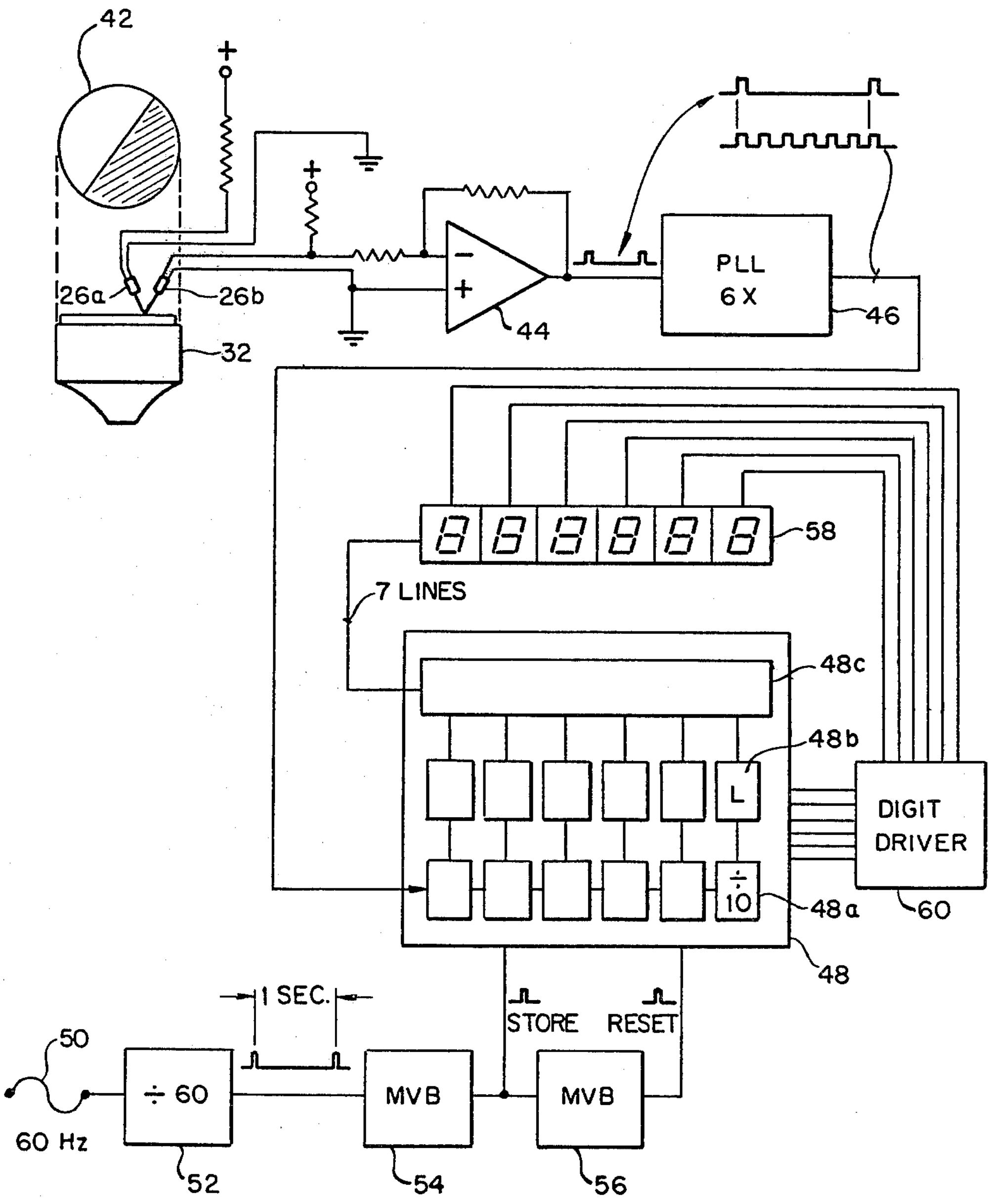
FIG. 5 is a schematic circuit diagram of the tachometer circuit employed to drive the digital display of the invention.

Reference is now made to FIG. 5 which is a schematic circuit diagram of the tachometer and digital driving circuit of the invention. As shown, centrifuge rotor 32 is fitted with cover 42 having a 180° non-reflecting surface so that when light from LED **26*a* impinges upon this surface, the light is substantially absorbed. As the rotor revolves and light from LED 26*a* impinges on the transparent (i.e., non-absorbing) segment of cover 42, this light is reflected to photo-transistor 26*b* thereby causing a current pulse to be generated for each revolution of the rotor. These pulses are amplified by amplifier 44 to a level compatible with phase-lock loop (PLL) 46. The function of PLL 46** is to multiply the frequency of the incoming pulses by a factor of 6 so that the frequency (Hz) of the pulses to be counted will be equivalent to rotor R.P.M. divided by 10. RPM/60 SEC. per minute=REV/SEC=Freq. Hz, therefore 6×RPM/60=Freq. Hz/10. For example, if the rotor were spinning at 60,000 R.P.M., the frequency to be counted would be multiplied by 6×(60,000/60)=60,000/10=6,000 Hz. Thus, if the pulse frequency is counted for a period of one second, the digital display would indicate 6,000. By adding a fixed zero (0) to the least significant end of the reading, the display will indicate the rotor R.P.M. as "60,000".

Integrated circuit (IC) generally designated by the block 48 provides six (6) decade counting **48*a*, latch 48*b*, and display multiplexing 48*c* functions. IC 48 is available as MOSTEK Device Model MK50398N sold by Mostek Corporation, Carrollton, Texas. To explain the functioning of the tachometer circuit shown in FIG. 5, it may be assumed that the six decade counters of IC 48 are reset to zero by a reset pulse from one shot (monostable) multivibrator (MVB) 56. A one-second period is provided by dividing the input 60 cycle line frequency 50, with divide-by 60 counter 52. (In instances where the line frequency is 50 cycles, a divide-by-50 counter is employed to generate the one-second period.) During the one-second period, the counters of IC 48** will accumulate a count of, say, 6,000.

At the end of the one-second period a pulse from one-shot MVB 54 will cause the latch portion of IC 48 to latch and store the accumulated count. Within a few microseconds after this store pulse, one-shot MVB 56 will again generate a reset pulse to clear the counters of IC 48 back to zero, and the cycle is repeated. Once the count is stored in the latch portion of IC **48*b*, the multiplex portion 48*c* of the IC will sequentially select each digit of the display 58 by IC driver 60, and also the appropriate latch in IC 48*b*. For example, if the reading to be displayed is 6,000 counts per second, the latch of IC 48*b* representing the fourth most significant decade would contain a count of six. The multiplexer portion of IC 48*c* would, therefore, output the appropriate display segment driver voltages to display a six in the fifth digit place, and 000 respectively in the fourth, third, second, and first digit place (counting from right to left) on display 58**.

The fixed zero which appears in the least significant digit (LSD) position is in actuality connected to the most significant digit (MSD) terminal of digit driver 60. This arrangement enables the display to read out well beyond the speed capability of the centrifuge (100,000 Hz=1,000,000 RPM), and serves to assure that all digits are multiplexed equally in time and thereby providing uniform digit brightness.

Due note should be taken of the advantageous features of the invention. One of these being that, upon closure of the centrifuge access door, the speed sensing elements **26*a* and 26*b*** are automatically positioned with respect to the cover of the centrifuge rotor in a manner which is consistently repeatable. This thereby eliminates any error traceable to geometry variations. In addition, the integral tachometer provided by the invention afford the operator of the centrifuge continuous readings of acceleration, steady-state, and deceleration rotor speeds, thereby enabling him to exercise more precise and consistent operation of the machine.

While in accordance with the patent statutes there has been described what at present is considered to be the preferred embodiments of the invention, it will be understood by those skilled in the art that various change and modifications may be made therein without departing from the invention and it is, therefore, the aim of the appended claims to cover all such changes and modifications as fall within the true spirit and scope of the invention.

We claim:

1. In an air driven centrifuge including an access door to a rotor chamber housing a rotor seat and a rotor having a plurality of turbine flutes formed in the underside thereof, said rotor seat including driving air jet means for impinging pressurized air streams against said turbine flutes for supporting and spinning said rotor on an air cushion above said rotor seat within said chamber, and photo-optical tachometer means, the improvement comprising:

- means in said door for automatically positioning the illuminating and sensing elements of a photo-optical tachometer over said rotor when said door is in a closed position;
- means on the illuminated portion of said rotor for alternately absorbing and reflecting said illumination when said rotor is rotating;
- digital display means for displaying said rotor R.P.M.;
- tachometer circuitry for processing and converting said reflected signals to drive said digital display means; and
- an enclosure on the outer side of said door for housing said circuit and display means.

2. The centrifuge as recited in claim 1 wherein said means for illuminating a portion of said rotor comprises a light emitting diode (LED).

3. The centrifuge as recited in claim 1 wherein said means for alternately absorbing and reflecting light comprises a circular cover adapted to said rotor wherein a 180° segment of said cover is a black matte surface.

4. The centrifuge as recited in claim 1 wherein said means for detecting the reflection signals of said illumination comprises a phototransistor.

5. The centrifuge as recited in claim 1 wherein said means for counting and displaying said detected signals as revolutions per minute (RPM) includes:

- circuitry for accumulating, timing and comparing said detected signals; and
- circuitry for decoding, driving and multiplexing and displaying the resultant value on a digital display.

6. An air driven centrifuge having a hinged access door on its top side and an enclosure having a sloping front side mounted on the outside of said access door comprising:

a digital display of centrifuge rotor velocity appearing on said sloping front side of said enclosure;

electronic means for computing and displaying said velocity; and an aperture in the access door communicating with said enclosure, said aperture adapted to receive and automatically position photo-optical tachometer means for sensing the velocity of said centrifuge rotor.

7. The centrifuge recited in claim 6 further comprising:

a rotor cover having a non-reflecting finish over a 180° segment of its outer surface.

* * * * *